United States Patent
Beloi et al.

(10) Patent No.: US 10,515,381 B2
(45) Date of Patent: Dec. 24, 2019

(54) SPENDING ALLOCATION IN MULTI-CHANNEL DIGITAL MARKETING

(71) Applicants: Aleksander Beloi, Seattle, WA (US); Mohamad Charafeddine, San Jose, CA (US); Girish Kathalagiri Somashekariah, Santa Clara, CA (US); Abhishek Mishra, San Jose, CA (US); Luis Quintela, Mountain View, CA (US); Sunil Srinivasa, Santa Clara, CA (US)

(72) Inventors: Aleksander Beloi, Seattle, WA (US); Mohamad Charafeddine, San Jose, CA (US); Girish Kathalagiri Somashekariah, Santa Clara, CA (US); Abhishek Mishra, San Jose, CA (US); Luis Quintela, Mountain View, CA (US); Sunil Srinivasa, Santa Clara, CA (US)

(73) Assignee: SAMSUNG SDS AMERICA, INC., Ridgefield Park, NJ (US)

( * ) Notice: Subject to any disclaimer, the term of this patent is extended or adjusted under 35 U.S.C. 154(b) by 239 days.

(21) Appl. No.: 15/677,568

(22) Filed: Aug. 15, 2017

(65) Prior Publication Data
US 2018/0047039 A1 Feb. 15, 2018

Related U.S. Application Data

(60) Provisional application No. 62/375,013, filed on Aug. 15, 2016.

(51) Int. Cl.
*G06Q 30/02* (2012.01)
*G06N 20/00* (2019.01)
*G06Q 10/06* (2012.01)

(52) U.S. Cl.
CPC ......... *G06Q 30/0206* (2013.01); *G06N 20/00* (2019.01); *G06Q 10/067* (2013.01);
(Continued)

(58) Field of Classification Search
CPC ......... G06Q 30/0206; G06Q 10/06375; G06Q 10/067; G06Q 30/0201; G06Q 30/0277; G06N 20/00; G06N 7/005
(Continued)

(56) References Cited

FOREIGN PATENT DOCUMENTS

CN 102063812 A * 5/2011

OTHER PUBLICATIONS

Gabriel Shaoolian, How to Allocate a Digital Marketing Budget for Your Brand, 2017 (Year: 2017).*

* cited by examiner

*Primary Examiner* — Tarek Elchanti
(74) *Attorney, Agent, or Firm* — Sughrue Mion, PLLC

(57) ABSTRACT

An approach for spending allocation, executed by one or more processors to provide one or more monetary output values in response to a request for determining spending allocation in a digital marketing channel, is provided. The approach fits one or more models to train a business environment simulator. The approach generates a supervised learning policy. The approach evolves a supervised learning policy into a distribution estimator policy by adjusting network weights of the supervised learning policy. The approach generates an optimized policy by evolving the distribution estimator policy through interaction with the business environment simulator. The approach determines a profit uplift of the optimized policy by comparing the optimized policy and the supervised learning policy. Further,
(Continued)

in response to the optimized policy outperforming the supervised learning policy, the approach deploys the optimized policy in a live environment.

14 Claims, 2 Drawing Sheets

(52) U.S. Cl.
CPC ... *G06Q 10/06375* (2013.01); *G06Q 30/0201* (2013.01); *G06Q 30/0277* (2013.01)

(58) Field of Classification Search
USPC .......................................................... 705/7.35
See application file for complete search history.

SPENDING ALLOCATION IN MULTI-CHANNEL DIGITAL MARKETING

CROSS-REFERENCE TO RELATED APPLICATION

This application claims priority under 35 U.S.C. § 120 to U.S. Provisional Application No. 62/375,013, filed on Aug. 15, 2016, in which the disclosure is incorporated herein by reference in its entirety.

BACKGROUND

This disclosure relates generally to machine learning applications, and more particularly, to optimizing spending allocations in multi-channel digital marketing, via machine learning models.

In an online marketplace, certain businesses generate leads on potential customers for various services or products. In order to generate revenue, the lead generating business sells these leads to the business selling the service or product. For example, the lead generating business may be a mortgage broker who collects leads about potential customers looking for loans, and in turn, the broker sells the collected leads to a bank. The profit, generated by selling the lead, is the difference between the amount of money received from selling the lead and the amount money spent to generate the demand for the lead.

In order to generate demand for these leads, business may rely on digital marketing channels, such as search engine marketing (SEM), online advertising, and social media marketing (SMM). Each channel type (e.g. SEM or SMM) can have a hierarchical structure with multiple lower levels for elements, such as campaigns or ad groups. The decision about maximum spending can be made at the channel level or at any of the lower levels in the hierarchy. For example, at the root level, the business may decide to spend money on the entire search engine, or for specific key words at the lowest level. In another example, the business may decide to spend on groupings of keywords, based on campaigns in different geographical locations. Therefore, the term "channel" can signify either the actual channel at the root of the hierarchy or at any of the lower levels, alone or in combination. Further, a digital marketing channel, which contains a hierarchical structure within that channel, may be divided by account, account per state, account per product (e.g., the business may serve personal loans in one account and refinance loans in another account). Within each account, there may be different groups like an ad group, and within each group, the business may own certain keywords. For example, an account may contain 10 groups, and each group may be responsible for 1000 keywords.

An objective of the lead generating is to maximize the conversion rate (i.e., leads into revenue), and in turn, maximize the gross profit for a particular period of time. However, these businesses are faced with the problem of determining how many resources should be allocated to each channel on an hourly and daily basis. In other words, at any given time slot during the day, in which the time slot granularity depends on how often spending can be modified in the channels, the business is faced with a decision as to how much money should be invested in each of the digital marketing channels.

Further, the leads captured through those channels have different cost and quality levels and yield different conversion rates, which change depending on state (e.g., time of the day, day of the week, effects from business competition, economy patterns and seasonal events) and capacity for processing the leads. Capacity is determined by constraints that limit the speed at which leads can be converted into revenue, such as availability of inventory, personnel constraints or business partners' limitations. The capacity for processing leads in each time slot is a critical factor in determining spending so as to avoid generating leads that the business does not have resources to convert into revenue. If the businesses overproduces leads and exceeds the capacity allowed for that marketplace, then the business is overspending on leads that cannot be sold to the banks. If the business underproduces leads, then the business is not optimally utilizing the digital marketing channels.

Further, the demand for keywords may change based on various situations, for instance, multiple businesses or competitors may be bidding for the same keywords; the bidding can change per hour; and search behavior of potential customers may vary. Additionally, the bidding may fluctuate per day, state, or geographical region. Therefore, if the business bids on keywords using a static rule, the business will not be able to react effectively to changes in the market, and may overproduce or under produce leads.

Rules derived from domain expertise that try to capture relationships among the state variables to determine allocation often fail to produce optimal solutions given the non-linearity of those relationships, especially as the number of marketing channels grows.

SUMMARY

In some exemplary embodiments, a spending allocation method, executed by one or more processors to provide one or more monetary output values in response to a request for determining spending allocation in a digital marketing channel, the spending allocation method includes: fitting one or more models to train a business environment simulator; generating a supervised learning policy; evolving a supervised learning policy into a distribution estimator policy by adjusting network weights of the supervised learning policy; generating an optimized policy by evolving the distribution estimator policy through interaction with the business environment simulator; determining a profit uplift of the optimized policy by comparing the optimized policy and the supervised learning policy; and in response to the optimized policy outperforming the supervised learning policy, deploying the optimized policy in a live environment.

In other exemplary embodiments, A non-transitory computer readable recording medium comprising a program to execute a spending allocation method to provide one or more monetary output values in response to a request for determining spending allocation in a digital marketing channel, the spending allocation method includes: fitting one or more models to train a business environment simulator; generating a supervised learning policy; evolving a supervised learning policy into a distribution estimator policy by adjusting network weights of the supervised learning policy; generating an optimized policy by evolving the distribution estimator policy through interaction with the business environment simulator; determining a profit uplift of the optimized policy by comparing the optimized policy and the supervised learning policy; and in response to the optimized policy outperforming the supervised learning policy, deploying the optimized policy in a live environment.

DETAILED DESCRIPTION

Exemplary embodiments of the present disclosure relate generally to machine learning applications, and more particularly, to optimizing a spending allocation policy in multi-channel digital marketing, via machine learning models. Exemplary embodiments recognize that as the number of digital marketing channels grow, the non-linearity among state variables present difficulties for a domain expert to capture the relationships of these variables in order to increase the conversion rate within the capacity constraints thereby optimizing profit. Exemplary embodiments for optimizing a spending allocation policy in multi-channel digital marketing via machine learning models are described below with reference to FIGS. 1-3.

Implementation of such exemplary embodiments may take a variety of forms, and exemplary implementation details are discussed subsequently with reference to the Figures.

Figure 1:
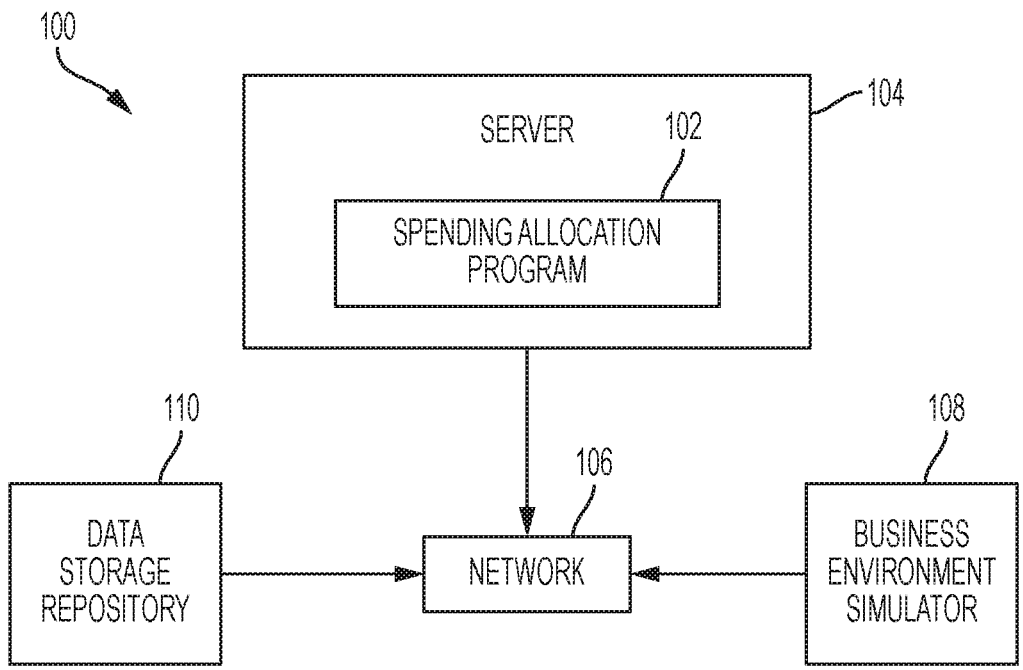
FIG. 1 is a functional block diagram illustrating a data processing environment, according to an exemplary embodiment.

FIG. 1 is a functional block diagram illustrating a data processing environment 100, according to an exemplary embodiment. FIG. 1 provides only an illustration of one implementation and does not imply any limitations with regard to a data processing environment in which different exemplary embodiments may be implemented. Many modifications of the data processing environment 100 may be made by those skilled in the art without departing from the scope of the disclosure as recited by the claims. In some exemplary embodiments, the data processing environment 100 includes a network 106; one or more data storage repositories, such as data storage repository 110; business environment simulator 108; and one or more servers, such as server 104, which operates the spending allocation program 102.

Network 106 interconnects server 104, repository 110, and business environment simulator 108. In general, network 106 can be any combination of connections and protocols capable of supporting communications between server 104, the spending allocation program 102, data storage repository 110, and business environment simulator 108. Network 106 can include wire cables, wireless communication links, fiber optic cables, routers, switches, firewalls, or any combination that can include wired, wireless, or fiber optic connections known by one of ordinary skill in the art. In some exemplary embodiments, network 106 can be a message bus. In an exemplary embodiment, network 106 can operate as a cluster of nodes (not shown) that can scale to handle larger message rates.

Data storage repository 110 stores data including, but not limited to, machine learning applications, machine learning models, data points from user activity, training data-sets, and historical data of actions and responses taken by a domain expert in a live business environment. The historical data can contain entries for one or more time slots. The entries may include a business state, the maximum amount spent per channel, the cost of the channel, a number of converted leads, and revenue that was generated. A combination of these entries is used to form an operational policy, which is the policy that the domain expert followed during normal business operations. These entries may be formed in various combinations and sequences that would be appreciated by one of ordinary skill in the art.

Data storage repository 110 can be any programmable electronic device or computing system capable of receiving, storing, and sending files and data, and performing computer readable program instructions capable of communicating with the server 104, and business environment simulator 108, via network 106.

Server 104 operates the spending allocation program 102, in accordance with the exemplary embodiments of the present disclosure. Server 104 can be any programmable electronic device or computing system capable of receiving and sending data, via network 106, and performing computer-readable program instructions known by one of ordinary skill in the art. The spending allocation program 102 may reside locally on one or more servers, such as server 104, in a data center (not shown), or cloud (not shown). In some exemplary embodiments, spending allocation program 102 instructs server 104 to fit one or more models to train a business environment simulator; generate a supervised learning policy; evolve the supervised learning policy; generate an optimized policy; and determine a profit uplift of the optimized policy.

In some exemplary embodiments, business environment simulator 108 contains three models (e.g., cost model 202, revenue model 204, and lead conversion model 206) for predicting business measures based on actions prescribed by a policy and another model (e.g., an action probability model 210). The Action probability model 210 determines the probability that an action would have been prescribed by the operational policy. These models are described in more detail in the related description of FIG. 2. The business environment simulator 108 uses historical data, retrieved from data storage repository 110, to build regression models (e.g., cost model 202, revenue model 204, and lead conversion model 206) and provide a prediction of cost, a prediction of revenue, and a prediction of lead conversion of different quantities of the state.

Figure 2:
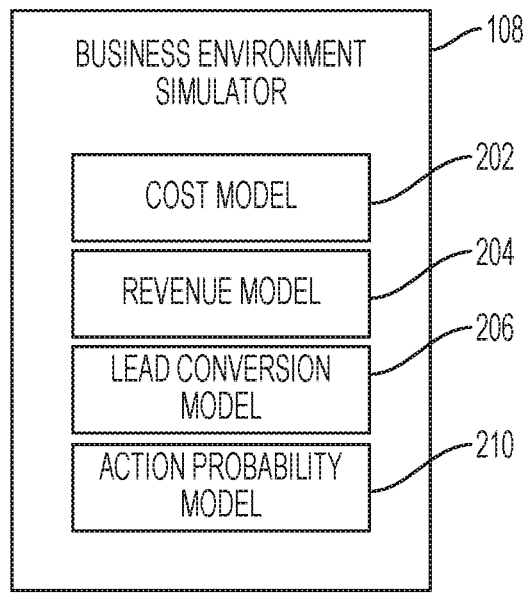
FIG. 2 is a functional block diagram depicting models for predicting business measures in a business environment simulator, according to an exemplary embodiment.

FIG. 2 is a functional block diagram depicting models for predicting business measures in the business environment simulator 108, according to an exemplary embodiment.

Business environment simulator 108 uses the regression models to predict revenue, cost and number of converted leads which are then used as input to the reward function. A reward may be an indicator provided by the business environment simulator 108 on the efficiency of the action prescribed by the policy. The efficiency may be relative to the maximization of gross profit.

The cost model 202 is a non-linear regression model trained on the historical data that predicts the total cost across all channels given the business state at a given time slot and the prescribed spending for each channel for this same time slot. The prescribed spending determines the maximum the business is willing to spend whereas the actual cost determines what was actually spent (e.g. due to the bidding process in search engine marketing).

The revenue model 204 is a non-linear regression model trained on the historical data that predicts the total revenue obtained from the converted leads given the business state at a given time slot and the prescribed spending for each channel for this same time slot.

The lead conversion model 206 is a non-linear regression model trained on the historical data that predicts the number of converted leads given the business state at a given time slot and the prescribed spending for each channel for this same time slot.

Historical data can include actions that were previously performed by the domain expert, and each action has a joint probability distribution of how a combination of actions function together. The actions can be set monetary amounts defined in a given time slot for a particular channel. The actions can also be a sequence of numbers. For example, an action, derived from the historical data, can be at 1 PM, $10.00 was allocated to a first search engine, $20 was allocated to a second search engine, and $30 was allocated to a third search engine.

However, a prediction, provided from the regression models, have a degree of inaccuracy, which varies among predictions. Therefore, the action probability model 210 is implemented to provide a confidence level that the action being provided by the policy would have been obtained based on the historical data.

In some exemplary embodiments, the action probability model 210 is a probability distribution fit through a method such as kernel density estimation or maximum likelihood that provides the probability that a given maximum spending allocation for a channel would have been prescribed by the policy that generated the historical data. If the probability prescribed by the action probability model 210 is low, there is little confidence on the accuracy of the quantities predicted by the cost model 202, revenue model 204, and lead conversion model 206. A low probability may be generated in situations where the simulator has not previously seen a particular state. A prediction with a low probability contains a margin of error that is not tolerable in that it provides no value in the training operations.

The confidence level of the predictions from the regression models is dependent on the actions and states contained in the historical data that are used as inputs for model training. To avoid misguiding a policy optimization method, business environment simulator 108 outputs, for example, a zero as the reward when the action being prescribed by the policy has low probability (according to Action Probability Model 210) of having been explained by the historical data set (i.e. low probability of having been prescribed by the operational policy). The business environment simulator 108 disregards the predictions with a low probability.

A probability may be for example a numerical value between 1 and 100, or a percentage. If for instance, the probability of a prediction does not exceed a predetermined threshold, then that prediction will be disregarded.

Figure 3:
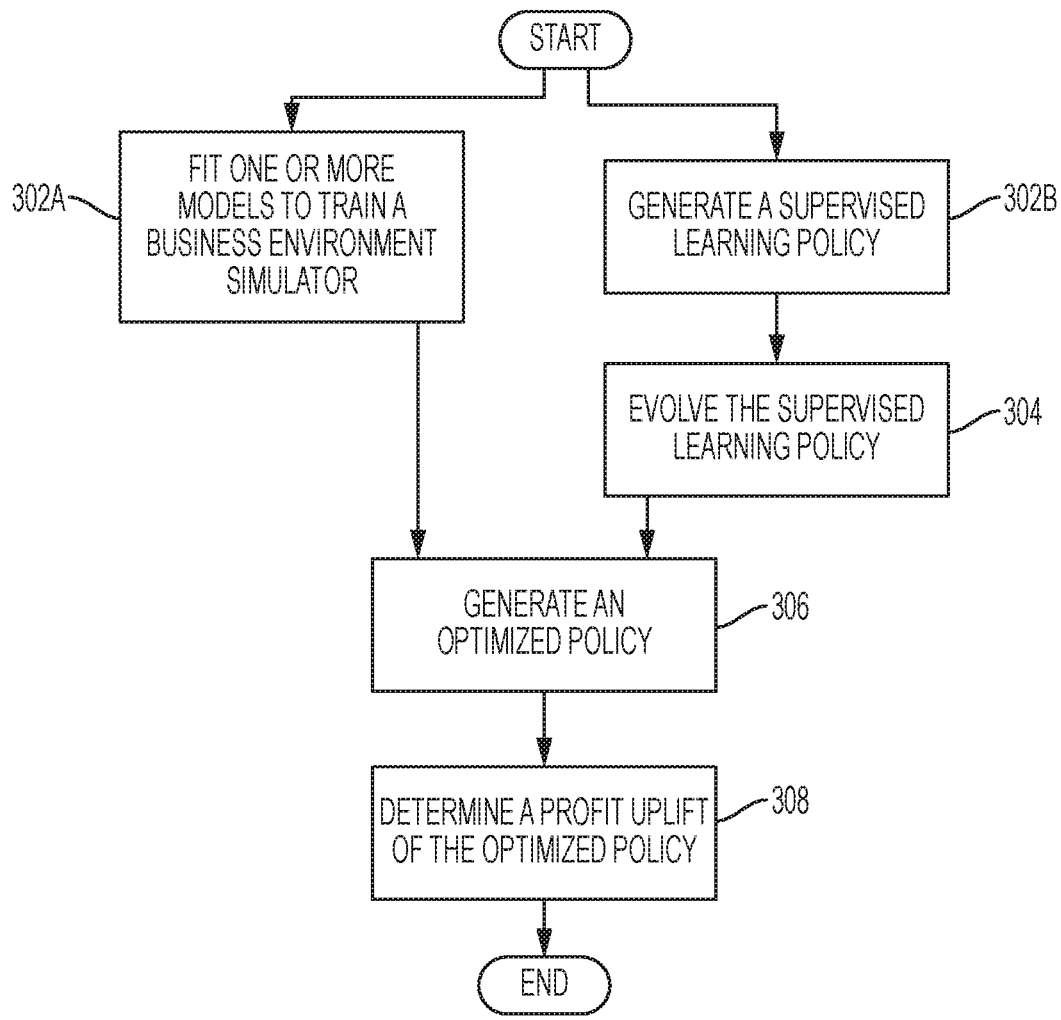
FIG. 3 is a flowchart illustrating the optimization of a spending allocation policy, according to an exemplary embodiment.

FIG. 3 is a flowchart illustrating the optimization of a spending allocation policy, according to an exemplary embodiment. In some exemplary embodiments, server 104 executes operational steps of spending allocation program 102, discussed in more detail below. In other exemplary embodiments, spending allocation program 102 may be executed by one or more processors and one or more data storage repositories.

Server 104 fits one or more models to train the business environment simulator 108 (302A). The one or more models fitted to train the business environment simulator 108 can include cost model 202, revenue model 204, lead conversion model 206, and action probability model 210.

Server 104 generates a supervised learning policy (302B). In some exemplary embodiments, server 104 generates a supervised learning policy by applying supervised learning on the historical data previously defined by the domain expert. That is, server 104 generates a supervised learning policy by cloning the operational policy previously defined by the domain expert. Server 104 creates the supervised learning policy using the action as a target and the business state features as predictor variables. The action can be, for example, the list of maximum spending allocation for a specific time slot, in which there is one allocation per channel, and the business state features can be, for example, the time of day or an amount of money previously allocated. The supervised learning policy can be represented by a neural network in which an output layer has one node for each channel predicting the maximum allocation in that channel.

Server 104 evolves the supervised learning policy (304). In some exemplary embodiments, server 104 evolves the supervised learning policy by obtaining the weights from the network underlying the generated supervised learning policy. Server 104 copies the weights from the generated supervised learning policy and applies a policy optimization method (e.g., policy gradient) and a distribution estimator method, using the historical data, to evolve and adjust the network weights of the generated supervised learning policy into a distribution estimator policy. The historical data can be the same historical data used to generate the supervised learning policy.

The policy optimization method updates the supervised learning policy so as to maximize the cumulative reward. Server 104 may receive the reward from a reward function that can combine multiple business measures to compute a single scalar. For example, the reward function could be expressed as gross profit multiplied by a penalizing factor that is inversely proportional to the difference between daily cumulative number of leads and the historical average total number of leads. This penalizing factor is used to provide the policy optimization method a signal as capacity for processing leads is being maxed out.

Server 104 can utilize the distribution estimator method (e.g. importance sampling or doubly robust estimator) if the policy optimization method is an on-policy method such as policy gradient, which requires the training data points to have been produced by the policy being evolved. Since server 104 evolves the supervised learning policy using historical data from the business measures as inputs, server 104 applies the distribution estimator method to adjust the reward relative to a ratio between two distributions (i.e., the supervised learning policy and the distribution estimator policy).

In some exemplary embodiments, server 104 performs operations 302B and 304 in parallel with operation 302A, in which case, server 104 trains business environment simulator 108 at the same time as creating the supervised learning policy. In other exemplary embodiments, server 104 performs operations 302B and 304 either before or after operation 302A.

Server 104 generates an optimized policy (306). Server 104 generates the optimized policy by applying a policy optimization method, using the business environment simulator 108, to evolve the distribution estimator policy into the optimized policy. The distribution estimator policy interacts directly with the business environment simulator 108, such as through on-line interaction. The policy optimization method may be for example a policy gradient.

Server 104 determines a profit uplift of the optimized policy (308). Server 104 determines the profit uplift of the optimized policy by comparing the optimized policy to the supervised learning policy. The profit uplift can be a percentage increase in cumulative profit over a fixed time period. Server 104 samples the trajectories of the optimized policy and the supervised learning policy in the simulated business environment 108 for a fixed time period, in which the time periods are the same for both the optimized policy and the supervised learning policy. Server 104 obtains the cumulative profit from both sets of trajectories. That is, server 104 obtains the allocation at each time slot of the time period for both the optimized policy and the supervised learning policy. Using the cumulative profit as inputs, server 104 calculates the uplift (and corresponding confidence level discussed below) yielded by the optimized policy and the supervised learning policy to determine whether the optimized policy outperforms the supervised learning policy. In some exemplary embodiments, server 104 calculates the uplift as a percentage increase on the cumulative reward obtained from the trajectories sampled from the supervised learning policy and the cumulative reward obtained from the trajectories sampled from the optimized policy.

To compensate for a margin of error in the simulated business environment 108, Server 104 applies a statistical test, such as a T-test, to calculate the confidence level for the uplift. In applying this statistical test, server 104 may use density estimation to model the error distribution and sample from this distribution during the statistical test.

For the cases in which the optimized policy does not outperform the supervised learning policy, the optimized policy is not put into production. In some exemplary embodiments, for the cases in which the optimized policy outperforms the supervised learning policy, server 104 replaces the domain expert or the previously deployed policy with the optimized policy to be utilized in a live environment. Server 104 can store the optimized policy in the data storage repository 110. The optimized policy seeks to maximize a business measure (e.g., gross profit) for a predetermined time period. In some other exemplary embodiments, several optimized policies may be generated and compared to one another to determine an optimal policy to deploy in a live business environment.

A user can input state variable values into a graphical user interface (not shown) to interact with the spending allocation program 102. In response to a request for determining spending allocation, utilizing the optimized policy, spending allocation program 102 outputs one or more monetary values that represent a maximum amount of money to be spent on a corresponding digital marketing channel, and displays the values on the graphical user interface. A user can follow the outputted values as guidance and make explicit allocations to each channel through the proper means as dictated by each channel.

Although the subject matter has been described in terms of exemplary embodiments, it is not limited thereto. Rather, the appended claims should be construed broadly, to include other variants and exemplary embodiments, which may be made by those skilled in the art without departing from the scope and range of equivalents of the subject matter.

What is claimed is:

1. A spending allocation method, executed by one or more processors to provide one or more monetary output values in response to a request for determining spending allocation in a digital marketing channel, the spending allocation method comprising:
    fitting a cost model, a revenue model, a lead conversion model, and an action probability model to train a business environment simulator, wherein
        the cost model comprises a non-linear regression model trained on historical data and predicts a total cost of one or more digital marketing channels,
        the revenue model comprises non-linear regression model trained on the historical data and predicts a total revenue obtained from converted leads,
        the lead conversion model comprises a non-linear regression model trained on the historical data and predicts a number of converted leads, and
        the action probability model is a probability distribution fit through a method providing a probability that a spending allocation for a digital marketing channel would have been prescribed based on the historical data;
    generating a supervised learning policy;
    evolving a supervised learning policy into a distribution estimator policy by adjusting network weights of the supervised learning policy;
    generating an optimized policy by evolving the distribution estimator policy through interaction with the business environment simulator, wherein the evolving further comprises applying a policy optimization method and a distribution estimator method to adjust the network weights of the supervised learning policy;
    determining a profit uplift of the optimized policy by comparing the optimized policy and the supervised learning policy; and
    in response to the optimized policy outperforming the supervised learning policy, deploying the optimized policy in a live environment.

2. The spending allocation method of claim 1, wherein the business environment simulator disregards a prediction from the non-linear regression models with a low probability according to the action probability model.

3. The spending allocation method of claim 1, wherein the generating a supervised learning policy comprises by applying supervised learning on historical data previously defined by a user.

4. The spending allocation method of claim 1, wherein the fitting is performed in parallel with the generating the supervised learning policy and the evolving a supervised learning policy.

5. The spending allocation method of claim 1, wherein determining the profit uplift further comprises sampling trajectories of the optimized policy and the supervised learning policy in a simulated environment, and obtaining a cumulative profit from the trajectories of the optimized policy and the trajectories of the supervised learning policies.

6. The spending allocation method of claim 5, wherein determining the profit uplift further comprises calculating the uplift yielded by the optimized policy and the supervised learning policy, using the cumulative profit as inputs.

7. The spending allocation method of claim 1, further comprising:
    generating more than one optimized policy, and
    determining the optimal policy to deploy in the live environment.

8. A non-transitory computer readable recording medium comprising a program to execute a spending allocation method to provide one or more monetary output values in response to a request for determining spending allocation in a digital marketing channel, the spending allocation method comprising:
    fitting a cost model, a revenue model, a lead conversion model, and an action probability model to train a business environment simulator, wherein
        the cost model comprises a non-linear regression model trained on historical data and predicts a total cost of one or more digital marketing channels,
        the revenue model comprises a non-linear regression model trained on the historical data and predicts a total revenue obtained from converted leads, the lead conversion model comprises a non-linear regression model trained on the historical data and predicts a number of converted leads, and the action probability model is a probability distribution fit through a method providing a probability that a spending allocation for a digital marketing channel would have been prescribed based on the historical data;

generating a supervised learning policy;

evolving a supervised learning policy into a distribution estimator policy by adjusting network weights of the supervised learning policy;

generating an optimized policy by evolving the distribution estimator policy through interaction with the business environment simulator, wherein the evolving further comprises applying a policy optimization method and a distribution estimator method to adjust the network weights of the supervised learning policy;

determining a profit uplift of the optimized policy by comparing the optimized policy and the supervised learning policy; and in response to the optimized policy outperforming the supervised learning policy, deploying the optimized policy in a live environment.

9. The non-transitory computer readable recording medium of claim 8, wherein the business environment simulator disregards a prediction from the non-linear regression models with a low probability according to the action probability model.

10. The non-transitory computer readable recording medium of claim 8, wherein the generating a supervised learning policy comprises by applying supervised learning on historical data previously defined by a user.

11. The non-transitory computer readable recording medium of claim 8, wherein the fitting is performed in parallel with the generating the supervised learning policy and the evolving a supervised learning policy.

12. The non-transitory computer readable recording medium of claim 8, wherein determining the profit uplift further comprises sampling trajectories of the optimized policy and the supervised learning policy in a simulated environment, and obtaining a cumulative profit from the trajectories of the optimized policy and the trajectories of the supervised learning policies.

13. The non-transitory computer readable recording medium of claim 12, wherein determining the profit uplift further comprises calculating the uplift yielded by the optimized policy and the supervised learning policy, using the cumulative profit as inputs.

14. The non-transitory computer readable recording medium of claim 8, further comprising:

generating more than one optimized policy, and determining the optimal policy to deploy in the live environment.

* * * * *